United States Patent
De Fontenay et al.

(10) Patent No.: US 6,412,798 B2
(45) Date of Patent: Jul. 2, 2002

(54) UPPER COUPLING ATTACHMENT FOR MACPHERSON STRUT

(75) Inventors: Etienne De Fontenay, Decize; Antoine Ducloux, La Machine, both of (FR)

(73) Assignee: Compagnie Generale des Etablissements Michelin-Michelin & Cie, Clermont-Ferrand (FR)

( * ) Notice: Subject to any disclaimer, the term of this patent is extended or adjusted under 35 U.S.C. 154(b) by 0 days.

(21) Appl. No.: 09/746,666

(22) Filed: Dec. 22, 2000

Related U.S. Application Data

(63) Continuation of application No. PCT/FR98/01366, filed on Jun. 26, 1998.

(51) Int. Cl.[7] .............................................. B60G 15/07
(52) U.S. Cl. ........................ 280/124.147; 280/124.155; 267/220
(58) Field of Search ................... 280/124.146, 124.147, 280/124.155; 267/220, 221

(56) References Cited

U.S. PATENT DOCUMENTS

| | | | |
|---|---|---|---|
| 4,274,655 A | | 6/1981 | Lederman |
| RE31,184 E | | 3/1983 | Lederman |
| 4,462,608 A | * | 7/1984 | Lederman ............ 280/124.155 |
| 4,497,523 A | * | 2/1985 | Lederman ............ 280/124.155 |
| 4,531,759 A | * | 7/1985 | Rezanka et al. ...... 280/124.155 |
| 4,618,127 A | * | 10/1986 | Le Salver et al. .......... 267/220 |
| 4,721,325 A | * | 1/1988 | Mackovjak et al. .. 280/124.155 |
| 5,064,176 A | | 11/1991 | Goto |
| 5,211,380 A | | 5/1993 | Germano |
| 5,308,104 A | * | 5/1994 | Charles ...................... 267/220 |
| 5,454,585 A | * | 10/1995 | Dronen et al. .............. 267/220 |

FOREIGN PATENT DOCUMENTS

| | | | |
|---|---|---|---|
| DE | 2946516 | | 5/1981 |
| DE | 8904871 | | 6/1989 |
| DE | 4221826 | | 1/1993 |
| EP | 0392513 | | 10/1990 |
| EP | 0501132 | | 9/1992 |
| EP | 0 619 196 A1 | * | 2/1994 |
| EP | 0 850 790 A1 | * | 7/1998 |
| FR | 2 630 375 A1 | * | 10/1989 |
| GB | 2217663 | | 11/1989 |
| GB | 2289109 | | 11/1995 |
| JP | 2-85004 A | * | 3/1990 |
| JP | 5-87175 A | * | 4/1993 |

* cited by examiner

*Primary Examiner*—Lanna Mai
*Assistant Examiner*—Ruth Ilan
(74) *Attorney, Agent, or Firm*—Baker Botts L.L.P.

(57) ABSTRACT

Disclosed in a coupling attachment for a MacPherson suspension shock strut having an elastic articulation for filtering and uncoupling on a path transmitting the shock absorber rod effects to the body, and a separate elastic block on a path transmitting the spring efforts to the body, wherein the device improves compactness without adversely affecting comfort.

19 Claims, 5 Drawing Sheets

UPPER COUPLING ATTACHMENT FOR MACPHERSON STRUT

CROSS REFERENCE TO RELATED APPLICATIONS

This application is a continuation application of international patent application Serial No. PCT/FR98/01366, filed on Jun. 26, 1998, which international application was published by the International Bureau in French on Jan. 6, 2000 as WO 00/00359.

BACKGROUND OF THE INVENTION

The present invention concerns MacPherson type suspension shock struts. Said shock struts contain a jack and a spring surrounding the jack. The jack secures a transverse guidance maintaining the wheel carrier and generally contains a shock absorber. The invention concerns, notably, the coupling attachments which constitute a filtering and connecting part ensuring anchorage of the upper part of the MacPherson shock struts on the body and which, if necessary, further provide a support for the spring. When shock struts for driving wheels are involved, a ball bearing ensures the necessary degree of rotation freedom between the wheel carrier and the body support surface.

Said coupling attachments contain a filtering and uncoupling articulation, called elastic articulation here, on the path transmitting the spring efforts to the body. That separate elastic block makes possible a filtering independent of the efforts transmitted by the spring and affords greater comfort. Or else the path transmitting the spring efforts to the body also passes through the elastic articulation. Numerous variations of such coupling attachments exist. This invention relates only to shock struts in which the efforts transmitted by the shock absorber rod passes through the elastic articulations and in which the load of the vehicles does not pass through said elastic articulation.

SUMMARY OF THE INVENTION

The object of the invention is to improve the compactness of the shock struts and more specifically the compactness of the assembly localized in the upper part of the shock strut, in order to leave free rein to stylists who want to design ever more plunging hoods.

It is, in fact, advantageous to have the least possible stresses as to the size of the suspensions. Another object of the invention is to reduce the cost of such coupling attachments, without impairing their quality of filtering the vibrations appearing when the vehicle is running over a road. That filtering is very important for passenger comfort.

The invention concerns an upper coupling attachment for a MacPherson vehicle suspension, comprising:

a mounting bearing for mounting on a vehicle body;

a support bearing and a centering bearing for engaging a ring transmitting a static load supported by the suspension, said support bearing and said centering bearing defining a housing for mounting the ring;

a center opening designed for receiving a rod of a shock strut having a body and a rod sliding in the body, said center opening determining the position of a shaft on which the body turns in relation to the rod;

a center reinforcement having said center opening on one side and a flange on the other side;

an outer reinforcement having said mounting bearing on one side and containing a flange surrounding a center hole;

an elastic block adhered to said outer reinforcement on the side opposite said mounting bearing, said elastic block having said support bearing for the ring;

an elastic articulation of elastomeric material, adhered to an anchoring surface machined on said outer reinforcement on one side and adhered to an anchoring surface 311 machined on said center reinforcement on the other side.

According to one aspect of the invention, said coupling attachment is such that:

said center reinforcement and said outer reinforcement are so shaped relative to each other that said center reinforcement does not pass through said center hole;

said center reinforcement and said outer reinforcement are so positioned in relation to each other that said outer reinforcement at least partially surrounds said center reinforcement such that said anchoring surfaces are partially superposed radially and axially displaced;

said support bearing and said centering bearing for the ring lying axially between said mounting bearing and said flange.

According to another aspect of the invention, said coupling attachment is such that said elastic block is made of an elastomeric material devoid of any metal reinforcement between the mounting bearing and the ball bearing support.

According to another aspect of the invention, said coupling attachment is such that said center reinforcement and said outer reinforcement are so positioned in relation to each other that said outer reinforcement at least partially surrounds said center reinforcement such that said anchoring surfaces are partially superposed radially and axially displaced;

said center reinforcement contains a roughly truncated cone-shaped side wall developing on the side of said center opening opposite the side receiving the shock strut, the vertex of the virtual cone being situated on the side of said center opening receiving the shock strut, said side wall having a maximum diameter $\Phi_M$, wherein the radially outer surface of said side wall contains said anchoring surface of said elastic articulation, said outer reinforcement contains an upper flange incorporating said mounting bearing on the body, said flange being extended by a roughly truncated cone-shaped side wall containing said anchoring surface of said elastic articulation, wherein said roughly truncated cone-shaped side wall containing said anchoring surface of said elastic articulation extends axially from the opposite side to said mounting bearing and has a minimum diameter $\Phi_m$ that is strictly less than $\Phi_M$.

It is with reference to the axis defined by the center opening that the axial direction (parallel to the axis) and radial direction (perpendicular to the axis) are defined. The center opening defines perfectly geometrically the mounting of the shock strut on the coupling attachment, for that is an area whereby one of the reinforcements is supported on the shock strut rod; there is no degree of freedom between the rod and said reinforcement.

The proposed coupling attachment fulfills the articulation functions allowing movements of the shock strut around the axis of deflection when the coupling attachment is used for a driving wheel. In all the uses, it fulfills the functions of filtering the spring through the elastic block and of filtering the shock absorber through the articulation. It is known that this type of suspension generally contains a so-called shock pad; this is an elastomer pad that the body of the shock absorber strikes when the suspension comes to a clearance stop. In that case, the suspension includes a bowl mounted on the rod and at least partially containing a shock pad concentric to the shock strut, said bowl being in contact with said center opening of said center reinforcement, and said bowl containing a support surface in the axial extension of the flange of the outer reinforcement.

The invention makes it possible to pass the load transmitted to the body by the shock pad without going through either the articulation or the ball bearing in case of use on driving wheels.

In fact, shocks, even when filtered by the shock pad, are harmful to the stability of the ball bearing, and the elastic articulation of this type of coupling attachment is not designed to take up heavy loads, for the spring load does not pass through said articulation.

The housing that the invention makes it possible to arrange enables the first turn of the spring and, if necessary, the ball bearing to be placed roughly in the same plane perpendicular to the axis as said articulation. According to that aspect of the invention, the suspension contains a spring, the first turn of which comes axially between the mounting bearing and the flange of the outer reinforcement, or else, in the case of driving wheels, contains a spring and a ball bearing, one of the races of which constitutes the said ring or is supported on said ring, the ball bearing coming axially between the mounting bearing and the flange, and the other race turning with the spring to follow the direction of the driving wheels.

The invention makes it possible to reduce the number of components of the upper anchorage of the shock strut on the body of the vehicle. It makes it possible to install a very high ball bearing, at the same height as the elastic articulation. Thus, the ball bearing does not result in any extra thickness in relation to the coupling attachment itself. The height of the coupling attachment is dictated only by the proportions of the elastic articulation ensuring uncoupling between the rod of the shock strut jack and the body of the vehicles, as well as the filtering ensuring, notably, better acoustic comfort.

The invention will be better understood from the description of nonlimiting examples. For example, a nonlimiting characteristic of these examples resides in the fact that the second race of the ball bearing is supported each time on an elastic block integral with said outer reinforcement.

BRIEF DESCRIPTION OF THE DRAWINGS

In the enclosed drawing the figures show an assembly, a ball bearing and a coupling attachment according to different variants of the present invention.

DESCRIPTION OF THE PREFERRED EMBODIMENTS

Figure 1:
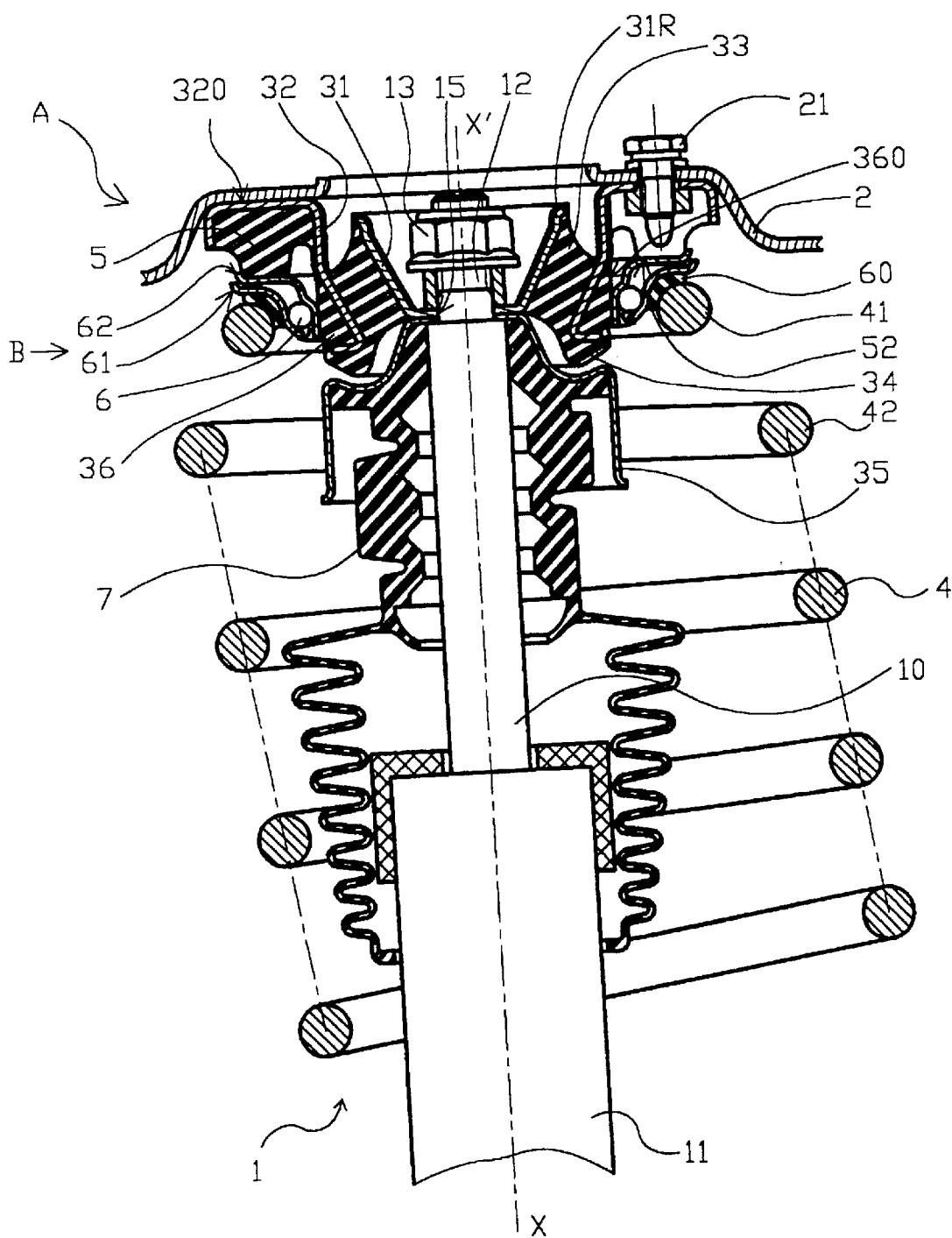
FIG. 1 shows a first variant.

In the different figures, one can see a MacPherson type wheel suspension shock strut 1, showing in particular the jack rod 10. One can also see the axis XX' of the rod 10. The rod 10 slides into a body 11 to which a wheel carrier (not represented) is connected. In such a shock strut, the damping effort opposes the relative motion of the rod 10 and body 11. The body 2 of the vehicle is partially shown. The coupling attachment A is the member making possible both mounting of the shock strut 1 on the body 2 and filtering of the running vibrations and allowing a certain clearance of the jack from the body 2. The coupling attachment A is functionally connected with other elements by the following parts:

a mounting bearing 320 for mounting on a body;

a support bearing 52 for a ring (the ring here is one of the races of ball bearing B, which corresponds to one particular embodiment) transmitting the load encountered by the spring 4 to the body 2;

a centering bearing of said ring, here the cylindrical face 360;

and, finally, a center opening 15 making it possible to center the rod 10 on the coupling attachment and to immobilize it in relation to certain elements of the coupling attachment, as will be understood below.

Another functional connection, this time optional, is secured by a rubber bead 34 enabling the coupling attachment to cooperate with the shock pad, as explained below.

A spring 4 determining the flexibility of the suspension can also be seen. An elastic articulation 33 ensures the connection of the rod 10 to the body, while allowing a certain relative motion between the body 2 and the rod 10. Ball bearing B is also shown, for the invention is illustrated in its application to driving wheels.

Let us first describe the support of the spring 4 on the body 2. The coupling attachment A contains an elastic block 5 independent of the elastic articulation 33. The elastic block 5, preferably made of an elastomeric material, is inserted on the path of transmission of the bearing efforts of the spring 4 on the body 2 of the vehicle. As a shock strut for driving wheels is involved, a bearing B with balls 6 is inserted between the spring 4 and the block 5. The upper ring of the spring and the first race 61 of the ball bearing B form here one and the same part.

The first turn 41 of the spring 4 is appreciably flat and rests on a pad 60, also preferably of elastomeric material. That pad 60 makes it possible to distribute the spring 4 load well on the periphery of the first race 61, at least on a predimensioned support arc. Said pad 60 produces a first damping stage attenuating the vibrations of the spring 4.

In general, any form of pad inserted between the first turn of the spring 4 and the first race 61 of the ball bearing can be used, for example, a sleeve in which the first turn is inserted. In order to damp effectively, a high-hysteresis rubber is preferably used.

Let us go back to the description of the ball bearing B. The second ring 62 of the ball bearing B is placed in contact, on mounting of the coupling attachment or on mounting of the shock strut on the vehicle, with said elastic block 5. The first ring 61 of the ball bearing has a suitable shape for direct enough support of the spring 4 on the latter not to interfere with rolling of the balls 6. It has an S-shape, one part of which serves as a support seat 610 for the spring 4 and another part of which serves as rolling path 611 of the balls 6. The second race 62 is similarly shaped. The rolling path 611 follows a slight incurved track, extended by a core 612 oriented roughly parallel to the axis of the ball bearing B. That core 612 provides the ball bearing B with the stiffness necessary for integration with the first race of the function usually provided by the ring. That core 612 is in turn extended by a bearing oriented roughly radially, materializing the seat 610 of the spring 4. A standard ball bearing can, of course, be used. In that case, the ring will usually be independent of the race of the ball bearing. The race can be premounted on the coupling attachment A for other than a driving wheel, or be applied under the ball bearing for a driving wheel shock strut.

It is to be noted that the first turn 41 of the spring 4 and the group of balls 6 of ball bearing B are roughly coplanar. The first turn goes round the balls 6 of ball bearing B. That makes possible great compactness of the coupling attachment. The first turn of the spring 4, the balls 6 of ball bearing B and the elastic articulation 33 are all roughly coplanar (plane perpendicular to the axis of the jack rod), that is, they are all at the same level as the coupling attachment.

Let us continue with the description of all the elements in contact on both sides with the elastic articulation 33.

Coupling attachment A contains a center reinforcement 31 having a flange 31R and a center opening 15 cooperating with the rod 10. The vertex of the rod 10 is rigidly mounted on the center opening of said center reinforcement 31, via a shoulder 14, thanks to a threaded rod 12 crossing the center reinforcement 31 and receiving a nut 13. Thus, the rod 10 "guides" the center reinforcement 31 in the direction where the position of the latter in space is determined by the attitude of the rod. The center reinforcement is there-fore going to follow faithfully the vibrations of the rod, the vertical clearance of the rod due to the shock absorber and even the clearance of the rod due to deflection of the wheels. The shock strut jack is positioned on one side of the center reinforcement 31.

Coupling attachment B also contains an outer reinforcement 32, having a bearing 320 for mounting on the body 2. The coupling attachment is rigidly connected by direct support of the outer reinforcement 32 on the body 2 thanks to screws 21. The outer reinforcement 32 contains a center passage leaving access for fastening of the jack rod 10 on the center reinforcement 31. The outer reinforcement 32 contains a flange 32R opposite the mounting bearing 320. The elastic articulation 33, advantageously made of elastomeric material, is integral with an anchoring surface 321, machined on said outer reinforcement 32, and is integral with an anchoring surface 311 machined on said center reinforcement 31. The anchoring surfaces are opposite each other and are roughly parallel to each other, when the coupling attachment is seen in section, as in the different figures.

The center reinforcement 31 contains a roughly truncated cone-shaped side wall, developing from the side of said center opening 15 opposite the side receiving the shock strut, that is, the jack rod 10. The vertex of the virtual cone is situated on the side of said center opening 15 receiving said shock strut. The side wall reaches a maximum radial dimension on the upper flange 31R of the latter. The maximum diameter $\Phi_M$ can be seen in FIG. 3. The radially outer face of said side wall contains said anchoring surface 311 of the elastic articulation 33.

The outer reinforcement 32 contains an upper flange incorporating said mounting bearing 320 on the body 2. The upper flange is extended here by a connecting wall, here a quasi-cylindrical wall 323 extending axially from the side opposite said mounting bearing. By adjusting the height of said quasi-cylindrical wall 323, the positioning of the mounting bearing 320 can be adjusted to the vehicle to be equipped. Then the outer reinforcement is extended into a roughly truncated cone-shaped side wall containing the anchoring surface 321 of the elastic articulation 33. The passage left in the center of the outer reinforcement 32 is minimal for the lower flange 32R of the outer reinforcement 32, said passage having a minimal diameter $\Phi_m$. The diameter $\Phi_M$ of the center reinforcement 31 is strictly greater than the diameter $\Phi_m$ of the outer reinforcement 32. The anchoring surfaces of the elastic articulation on said center reinforcement 31 and outer reinforcement 32 are roughly truncated cone-shaped and are oriented as shown on the different figures, that is, pointing toward the shock strut and not toward the body of the vehicle.

Hence, said center reinforcement 31 and outer reinforcement 32 are so shaped and positioned in relation to each other that a displacement of the center reinforcement along the axis of said jack, in a direction separating said jack from said mounting bearing, brings said anchoring surfaces of the elastic articulations close to each other, and so shaped and positioned in relation to each other that the projection, parallel to the axis of said jack, of said anchoring surface on the center reinforcement is superposed, at least in part, with the projection, parallel to the axis of said jack, of said anchoring surface on the outer reinforcement.

The end portion of the outer reinforcement 32 opposite said mounting bearing 320 contains a flat surface 322 roughly perpendicular to the axis of the shock strut, in the extension of the flange 32R, here extending the flange 32R radially toward the wider radii. The lower flange 32R is covered with a rubber bead 34 protruding from the side opposite the mounting bearing. A lower bowl 35, the base of which is bored to let the head of the jack rod 10 pass, is mounted under the coupling attachment. The lower bowl 35 is oriented opposite the outer reinforcement 32, that is, its concavity is opposite the concavity of the center reinforcement 31. That bowl 35 is designed to contain a shock pad 7. Outside of stresses emanating from the jack rod 10, a functional play exists between a support surface 350 on the outer face of the bowl 35 and the rubber bead 34 facing it. That makes it possible to shear-stress the elastic articulation 33. The elastic articulation 33 ensures an axial filtering (the functional play mentioned above allows it) and radial filtering of the upper end of the rod 10 in relation to the reinforcement 32 and, therefore, in relation to the body 2. Furthermore, it allows inclination of the rod 10 around a virtual center of rotation situated approximately at the intersection of the normal lines centered on the truncated cone-shaped bearings serving as anchorage of the elastic articulation 33 on said center reinforcement 31 and outer reinforcement 32. As known, those movements are necessary for deflection of the wheels.

On the radially outer side of the quasi-cylindrical wall of the outer reinforcement 32, that is, on the side opposite the elastic articulation 33, a filler 36 cooperates with the second race 62 of the ball bearing B. Very advantageously, the latter is made of the same material as the elastic articulation. It is therefore a rubber filler 36, dimensioned to be slightly squeezed against the second race 62 of the ball bearing, in order to center it. That filler 36 thus constitutes with its cylindrical surface 360 a male part which can be inserted inside the ball bearing B, the second race 62 of which has the shape of a fitted female part. Let us note that the role of this filler in taking up the load of the ball bearing B is negligible, that loading being transmitted by the second race 62 directly on the elastic block 5. Centering can also be carried out on the radially outer wall of the elastic block 5.

As for the first race 61, it is kept in place, for example, by a sealing lip, as known per se, acting only to oppose accidental separation of the races on handling of the ball bearing during its mounting on the coupling attachment and during mounting of the coupling attachment in the shock strut.

Figure 3:
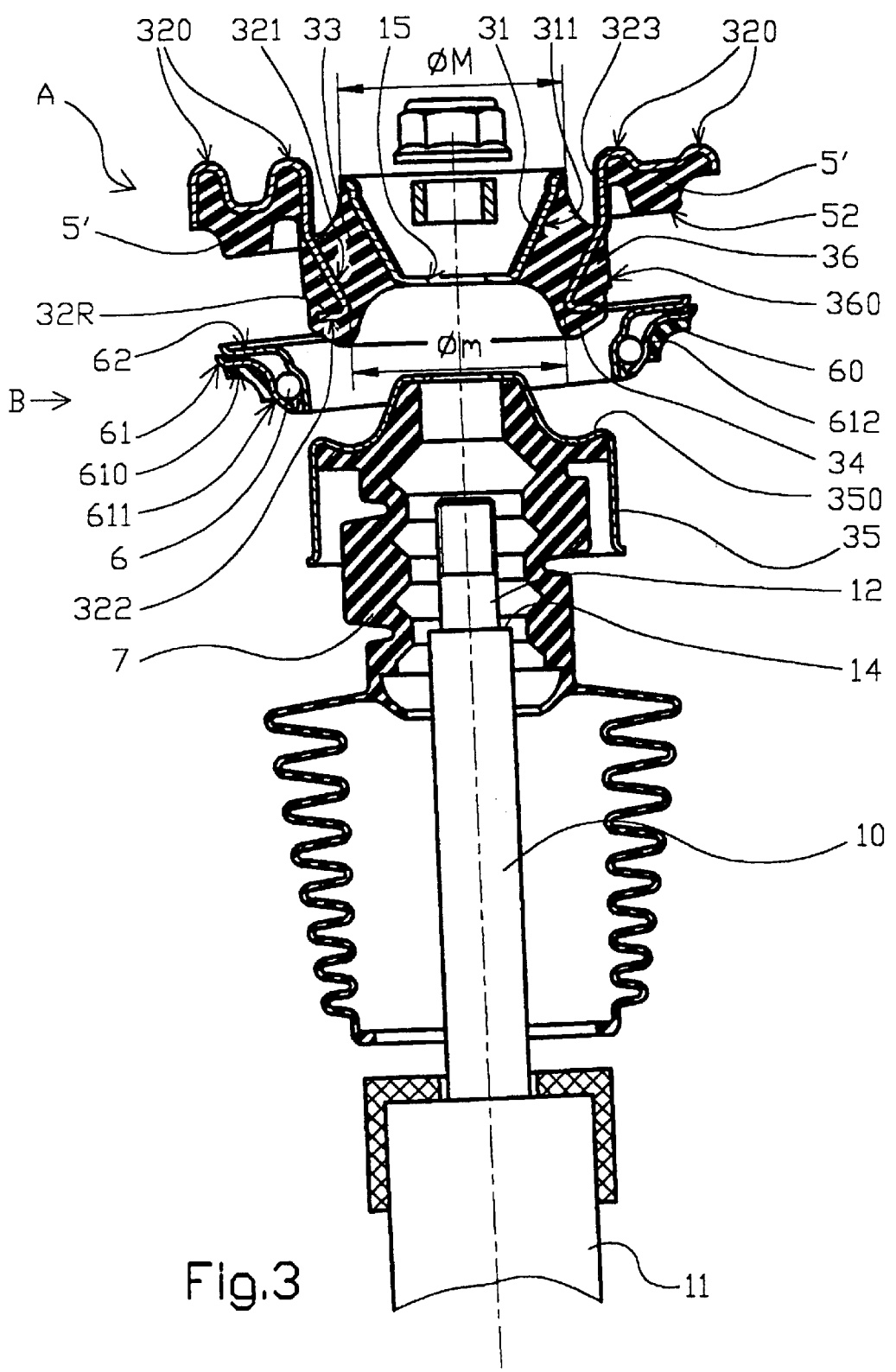
FIG. 3 shows an exploded view of that second variant.

The elastic block 5 is also integral with the lower face of the flange of the outer reinforcement 32. FIG. 3 shows the coupling attachment A isolated from the other elements of the MacPherson suspension. The coupling attachment A incorporates the outer reinforcement 32 and the center reinforcement 31. The latter can be made in a single injection operation on the previously adhered reinforcements, making it possible to obtain with a single duplicate molding on the outer reinforcement 32 both filtering and uncoupling of the jack rod 10 (elastic articulation 33), a support for the lower bowl containing the shock pad (bead 34), the resilience stop which is integrated here with the elastic articulation 33 itself and a second stage for filtering of the spring (elastic block 5) with a support surface 52, as well as a filler 36 for centering and retaining a ring, here ball bearing B. It is unnecessary to incorporate a metal reinforcement under the support bearing 52 receiving the ring (materialized here by the second race 62 of the ball bearing). A low-hysteresis rubber is preferably used, the selection being dictated rather by what is most suitable for said elastic articulation 33. The second filtering stage of the spring 4 can be made of the same material.

Thanks to a judicious arrangement of the anchoring surfaces on the outer and center reinforcements of the elastic articulation 33, the examples illustrating the invention thus show that said surfaces play the safety role of preventing dismounting for the shock strut, which not only is favorable to cost of the coupling attachment, owing to the possible elimination of one element, but further ensures greater compactness of the coupling attachment. The inclination of the anchoring surfaces, having a truncated cone shape, permits, in spite of everything a sufficient relative mobility of said contact surfaces, by elastically stressing the elastomeric block 33. The elastic articulation plays its uncoupling role by permitting the relative movement between the body and the shock strut with roughly the same mobility as is currently encountered. The filtering capacities are not affected.

Figure 2:
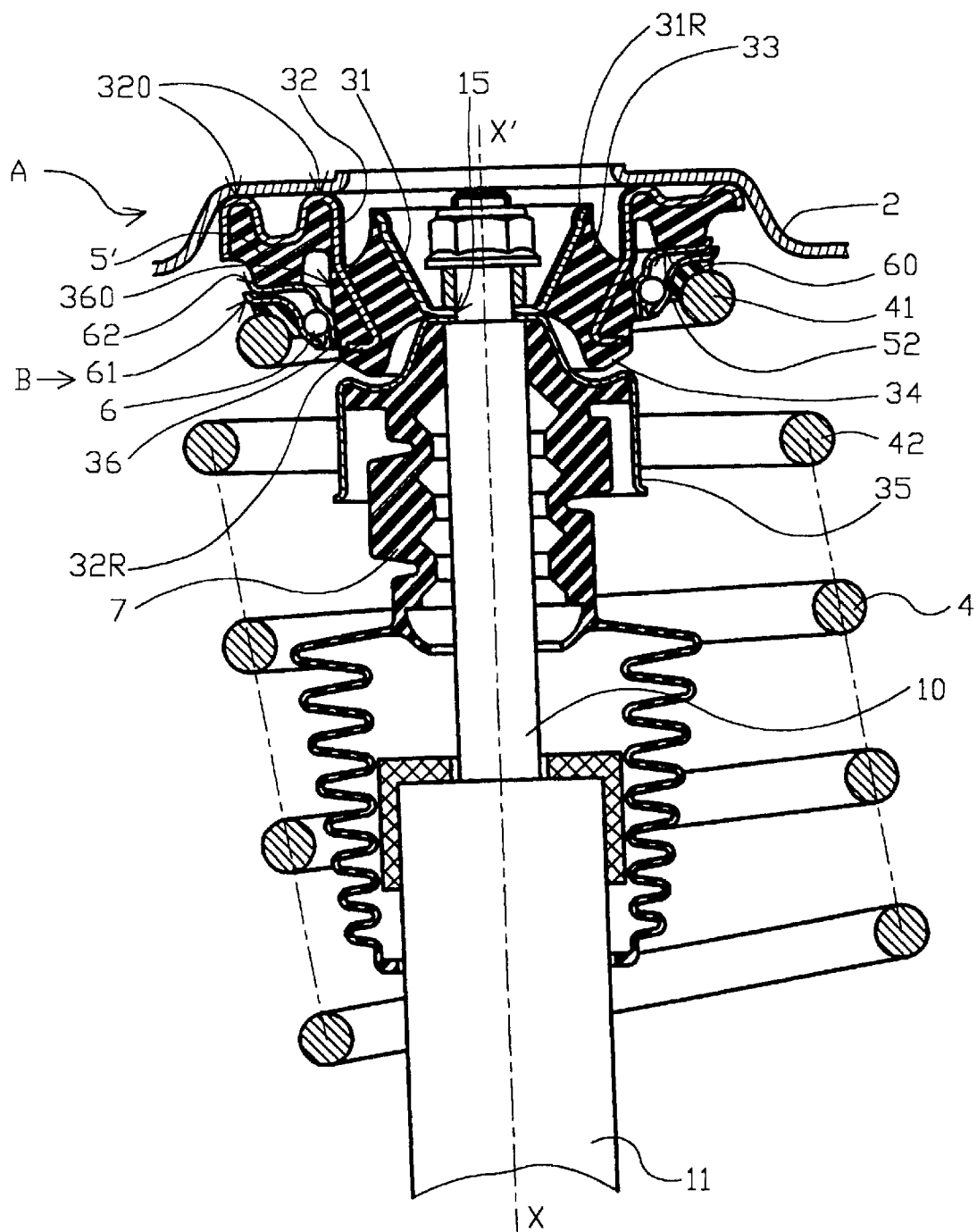
FIG. 2 show a second variant, being distinguished from the first by the way the ball bearing is supported.
Figure 4:
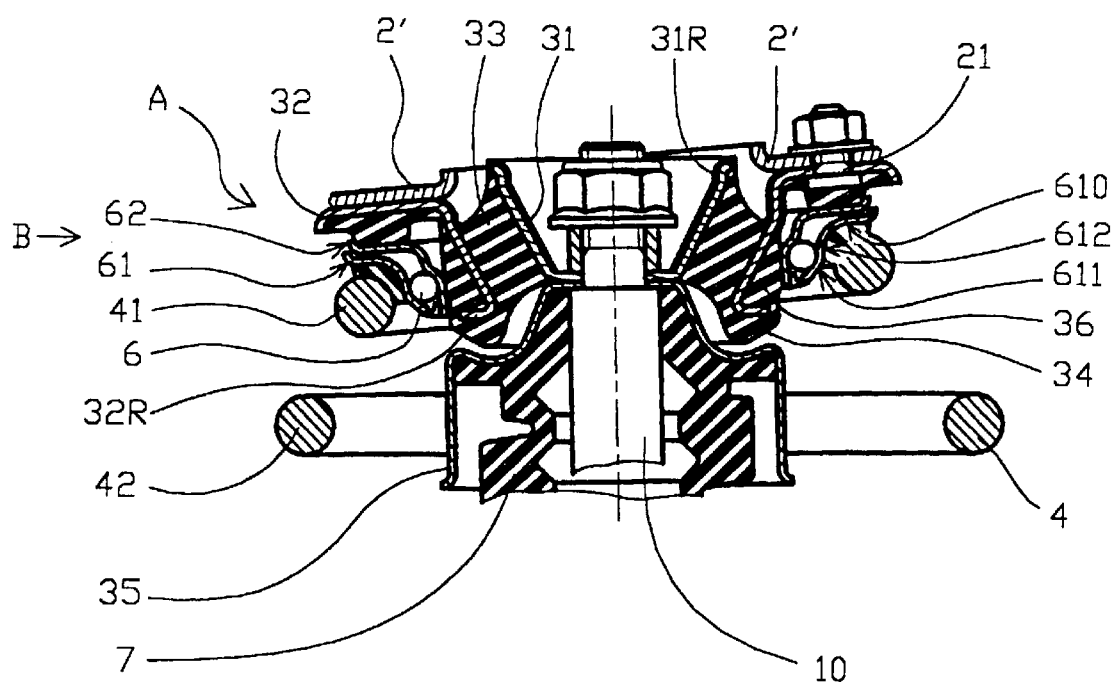
FIG. 4 shows a third variant in which the housing of the coupling attachment on the body of the vehicle is different.

The second and third variants have inclination of the plane of the ball bearing B relative to the axis of the jack in common, said plane not being perpendicular to said axis, as in FIG. 1, but being inclined by approximately 4° relative to the perpendicular. An inclination about half the inclination of the pivot axis relative to the axis of the jack seems favorable. In FIG. 2, this is obtained thanks to a slanting elastic block 5'. In FIG. 4, this result is obtained because the support of coupling attachment A on the body 2' is in turn inclined.

Figure 5:
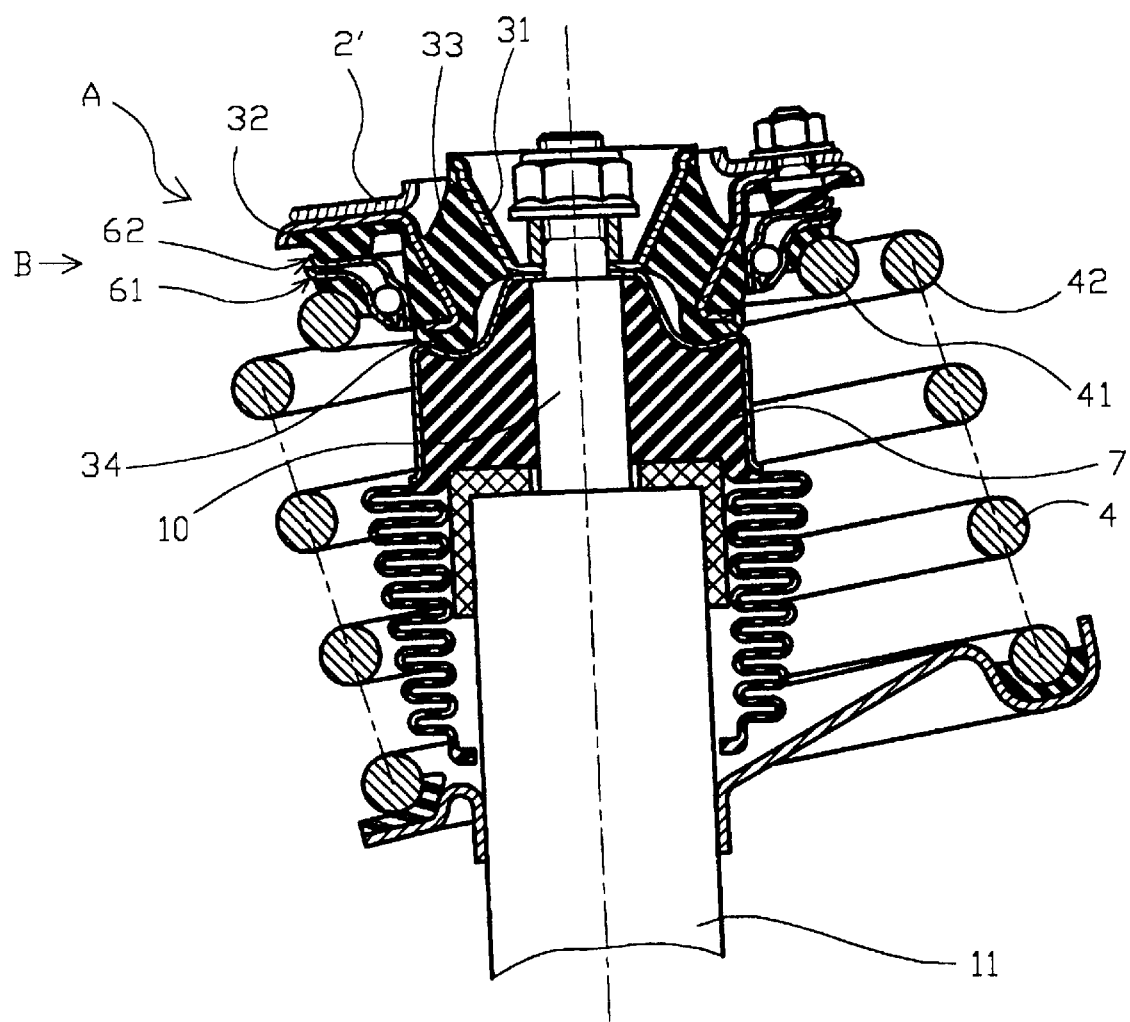
FIG. 5 shows the third variant in a clearance stop configuration.

In all the variants, a spring 4 is represented, the first turn 41 of which is contracted in relation to the other turns. The diameter of the second turn 42 is greater than the diameter of the first turn 41. That further improves compactness, as FIG. 5 makes it possible to understand. The shock pad 7 visible in FIG. 5 is the same one shown in the other figures, compression by the body 11 having deformed it until it fills the entire volume available inside the bowl 35. In that case, at stop, it can be seen that the second turn 42 is also roughly in the same plane as the first turn 41, as the ball bearing B and as the elastic articulation 33. The same figure shows that the play between the bowl 35 and the rubber bead 34 is cancelled out, which, taking into account the compression of the shock pad 7, enables the load transmitted to the body 11 to be essentially transferred direct to the outer reinforcement 32 via the flat surface 322, without overloading the elastic articulation 33 and without passing through the ball bearing B. The flat surface 322 forms a support designed to receive the load transmitted by the shock pad 7 integral with the shock strut rod.

Thus, it can be seen that the invention makes possible a great compactness of the coupling attachment A. The support bearing 52 (and even the centering bearing) make it possible to create a housing for the ring transmitting the load encountered by the spring, said housing lying axially between the mounting bearing 320 and the flange 32R. It is even possible for the first turn 41 of the spring 4 to lie axially between the mounting bearing 320 and the flange 32R. Furthermore, by using a spring with contracted first turn, it is also possible for the second turn 42, on maximum compression of the shock strut, to be axially compressed between the mounting bearing 320 and the flange 32R.

In summary, the upper coupling attachment A for a MacPherson suspension shock strut comprises an elastic articulation 33 filtering and uncoupling on the path transmitting the shock absorber rod efforts to the body 2 and a separate elastic block 5 on the path transmitting the spring 4 efforts to the body 2. This arrangement improves compactness without adversely affecting comfort.

We claim:

1. An upper coupling attachment for a MacPherson vehicle suspension, comprising:

a mounting bearing for mounting on a vehicle body;

a support bearing and a centering bearing for engaging a ring transmitting a static load supported by the suspension, said support bearing and said centering bearing defining a housing for mounting the ring;

a center opening designed for receiving a rod of a shock strut having a body, the rod sliding in the strut body, said center opening determining the position of an axis about which the shock strut body turns in relation to the rod;

a center reinforcement having opposite ends, wherein one end forms said center opening and the opposite end forms a flange;

an outer reinforcement having opposite ends, wherein one end forms said mounting bearing and the opposite end forms a flange that surrounds a center hole;

an elastic block adhered to the mounting bearing end of said outer reinforcement, said elastic block having said support bearing for the ring;

an elastic articulation of elastomeric material, adhered to an anchoring surface provided on said outer reinforcement and adhered to an anchoring surface provided on said center reinforcement; said coupling attachment being such that:

said center reinforcement and said outer reinforcement are shaped relative to each other so that said center reinforcement does not pass through said center hole;

said center reinforcement and said outer reinforcement are positioned in relation to each other so that said outer reinforcement at least partially surrounds said center reinforcement such that said anchoring surfaces are partially superposed radially and axially displaced;

said center reinforcement contains a roughly truncated cone shaped side wall developing on the side of said center opening opposite the side receiving the shock strut, the virtual vertex of the roughly truncated cone being situated on the side of said center opening opposite the side receiving the shock strut;

said outer reinforcement contains an upper flange incorporating said mounting bearing on the vehicle body, said flange being extended by a roughly truncated cone-shaped side wall containing said anchoring surface of said elastic articulation;

said support bearing and said centering bearing for the ring lying axially between said mounting bearing and said outer reinforcement flange.

2. An upper coupling attachment for a MacPherson vehicle suspension, comprising:
a mounting bearing for mounting on a vehicle body;
a support bearing and a centering bearing for engaging a ring transmitting a load of the vehicle, said support bearing and said centering bearing defining a housing for mounting the ring;
a center opening designed for receiving a rod of a shock strut having a body, the rod sliding in the shock strut body, said center opening determining the position of an axis about which the shock strut body turns in relation to the rod;
a center reinforcement having opposite ends, wherein one end forms said center opening and the opposite end forms a flange;
an outer reinforcement having opposite ends, wherein one end forms said mounting bearing and the opposite end forms a flange that surrounds a center hole;
an elastic block adhered to said outer reinforcement on the end that forms the mounting bearing, said elastic block having said support bearing for the ring, and said elastic block consisting of an elastomeric material without metal reinforcement in its thickness between said mounting bearing and said support bearing;
a said center reinforcement contains a roughly truncated cone shaped side wall developing on the side of said center opening opposite the side receiving the shock strut, the virtual vertex of the roughly truncated cone being situated on the side of said center opening receiving the shock strut;
said outer reinforcement contains an upper flange incorporating said mounting bearing on the vehicle body, said flange being extended by a roughly truncated cone-shaped side wall containing said anchoring surface of said elastic articulation;
an elastic articulation of elastomeric material, adhered to an anchoring surface provided on said outer reinforcement and adhered to an anchoring surface provided on said center reinforcement.

3. A coupling attachment according to claim 1 or 2, in which said center reinforcement flange is situated axially in relation to said center opening on the side opposite the side intended to receive the shock strut rod.

4. A coupling attachment according to claim 1 or 2, in which said anchoring surface on said outer reinforcement is extended axially more distant from said mounting bearing of said outer reinforcement than said anchoring surface on said center reinforcement.

5. A coupling attachment according to claim 1 or 2, in which
said center reinforcement side wall having a maximum diameter $\Phi M$, wherein the radially outer surface of said side wall contains said anchoring surface of said elastic articulation;
wherein said roughly truncated cone-shaped outer reinforcement side wall containing said anchoring surface of said elastic articulation extends axially from the opposite end to said mounting bearing and has a minimum diameter $\Phi m$ that is strictly less than maximum diameter $\Phi M$.

6. An upper coupling attachment for a MacPherson vehicle suspension, comprising:
a mounting bearing for mounting on a vehicle body;
a rolling support bearing and a centering bearing for engaging a ring transmitting a load of the vehicle, said support bearing and said centering bearing defining a housing for mounting the ring;
a center opening designed for receiving a rod of a shock strut having a body, the rod sliding in the body, said center opening determining the position of an axis about which the shock strut body turns in relation to the rod;
a center reinforcement having opposite ends, wherein one end forms said center opening and the opposite end forms a flange;
an outer reinforcement having opposite ends, wherein one end forms said mounting bearing and the opposite end forms a flange that surrounds a center hole;
an elastic block adhered to said outer reinforcement on the end that forms the mounting bearing, said elastic block having said support bearing;
an elastic articulation of elastomeric material, adhered to an anchoring surface provided on said outer reinforcement and adhered to an anchoring surface provided on said center reinforcement; said coupling attachment being such that:
said center reinforcement and said outer reinforcement are positioned in relation to each other so that said outer reinforcement at least partially surrounds said center reinforcement such that said anchoring surfaces are partially superposed radially and axially displaced;
said center reinforcement contains a roughly truncated cone-shaped side wall developing around said center opening, the virtual vertex of the cone being situated in the direction of said center opening receiving the shock strut, said side
wall having a maximum diameter $\Phi_M$, wherein the radially outer surface of said side wall contains said anchoring surface of said elastic articulation;
said outer reinforcement contains an upper flange incorporating said mounting bearing on the vehicle body, said flange being extended by a roughly truncated cone-shaped side wall containing said anchoring surface of said elastic articulation, wherein said roughly truncated cone-shaped side wall containing said anchoring surface of said elastic articulation extends axially from the opposite end to said mounting bearing and has a minimum diameter $\Phi_m$ that is strictly less than maximum diameter $\Phi_M$.

7. A coupling attachment according to claim 2 or 6, in which said support bearing and said centering bearing for the ring lie axially between said mounting bearing and said outer reinforcement flange.

8. A coupling attachment according to claim 2 or 6, in which said center reinforcement and said outer reinforcement are so shaped in relation to each other that said center reinforcement does not pass through said center hole.

9. A coupling attachment according to claim 8, in which the portion of said outer reinforcement flange opposite said mounting bearing contains a flat surface roughly perpendicular to the axis of the shock strut, wherein said flat surface forms a support designed to receive the load transmitted by a shock pad integral with the shock strut rod.

10. A coupling attachment according to claim 9, in which the outer reinforcement flange is covered by a rubber bead protruding axially from the end opposite said mounting bearing.

11. A MacPherson vehicle suspension comprising a coupling attachment according to claim 1, 2 or 6, including a bowl mounted on the rod at least partially containing a shock pad concentric to the shock strut, said bowl being in contact with said center opening of said center reinforcement, and said bowl containing a support surface in the axial extension of said flange of said outer reinforcement.

12. A MacPherson vehicle suspension comprising a coupling attachment according to claim 1, 2 or 6, including a spring having at least one turn, wherein a first turn lies axially between said mounting bearing and said outer reinforcement flange.

13. Suspension according to claim 12, in which the diameter of a second turn of said spring is greater that the diameter of said first turn.

14. A MacPherson vehicle suspension for a driving wheel, comprising a coupling attachment according to claim 1, 2 or 6, containing a spring having at least one turn and a ball bearing having a first and second race, wherein said second race constitutes the ring or is supported on the ring, wherein said ball bearing comes axially between said mounting bearing and said flange, and wherein said first race turns with said spring to follow the direction of said driving wheel.

15. Suspension according to claim 14, in which the first turn of said spring lies axially between said mounting bearing and said flange.

16. Suspension according to claim 15, in which the diameter of a second turn of said spring is greater than the diameter of said first turn.

17. A coupling attachment according to claim 7, in which said center reinforcement and said outer reinforcement are so shaped in relation to each other that said center reinforcement does not pass through said center hole.

18. A coupling attachment according to claim 17, in which the portion of said outer reinforcement flange opposite said mounting bearing contains a flat surface roughly perpendicular to the axis of the shock strut, wherein said flat surface forms a support designed to receive the load transmitted by a shock pad integral with the shock strut rod.

19. A coupling attachment according to claim 18, in which the outer reinforcement flange is covered by a rubber bead protruding axially from the end opposite said mounting bearing.

* * * * *